United States Patent
Cloft et al.

(10) Patent No.: US 10,184,404 B2
(45) Date of Patent: Jan. 22, 2019

(54) GEARED GAS TURBINE ENGINE ACCESSORY GEARBOX

(71) Applicant: United Technologies Corporation, Hartford, CT (US)

(72) Inventors: Thomas G. Cloft, Glastonbury, CT (US); Robert L. Gukeisen, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 371 days.

(21) Appl. No.: 14/427,334

(22) PCT Filed: Jan. 21, 2013

(86) PCT No.: PCT/US2013/022370
§ 371 (c)(1),
(2) Date: Mar. 11, 2015

(87) PCT Pub. No.: WO2014/046713
PCT Pub. Date: Mar. 27, 2014

(65) Prior Publication Data
US 2015/0233300 A1 Aug. 20, 2015

Related U.S. Application Data

(60) Provisional application No. 61/703,446, filed on Sep. 20, 2012.

(51) Int. Cl.
*B64D 41/00* (2006.01)
*F02C 3/04* (2006.01)
(Continued)

(52) U.S. Cl.
CPC .............. *F02C 7/32* (2013.01); *B23P 19/042* (2013.01); *B64D 41/00* (2013.01); *F02C 3/04* (2013.01);
(Continued)

(58) Field of Classification Search
CPC ...... F02C 7/32; F02C 3/04; F02C 7/36; B23P 19/042; B64D 41/00; B64D 2041/002;
(Continued)

(56) References Cited

U.S. PATENT DOCUMENTS 2,978,869 A * 4/1961 Hiscock .................... F02C 7/32
60/791
4,437,627 A 3/1984 Moorehead
(Continued)

FOREIGN PATENT DOCUMENTS

| EP | 2011979 | 1/2009 |
| EP | 2060759 | 5/2009 |
| EP | 2098757 | 9/2009 |

OTHER PUBLICATIONS

Extended European Search Report for Application No. 13838121.5 dated Dec. 2, 2015.
(Continued)

*Primary Examiner* — Justin Seabe
*Assistant Examiner* — Joshua R Beebe
(74) *Attorney, Agent, or Firm* — Carlson, Gaskey & Olds, P.C.

(57) ABSTRACT

A gas turbine engine includes a gearbox. The gearbox includes a housing at a forward part of a core compartment of a gas turbine engine. A plurality of accessory drives are each configured to rotatably couple the gas turbine engine accessory gearbox to one of a plurality of accessory components.

10 Claims, 7 Drawing Sheets

(51) Int. Cl.
  *F02C 7/32*     (2006.01)
  *F02C 7/36*     (2006.01)
  *B23P 19/04*    (2006.01)

(52) U.S. Cl.
  CPC .......... *F02C 7/36* (2013.01); *B64D 2041/002* (2013.01); *F05D 2220/32* (2013.01); *F05D 2230/60* (2013.01); *Y10T 29/49231* (2015.01)

(58) Field of Classification Search
  CPC ......... Y01T 29/49231; Y10T 29/49231; F05D 2220/32; F05D 2230/60
  USPC ..................................................... 415/122.1
  See application file for complete search history.

(56) References Cited

U.S. PATENT DOCUMENTS

| | | |
|---|---|---|
| 5,410,870 A | 5/1995 | Brault et al. |
| 5,687,561 A | 11/1997 | Newton |
| 6,170,252 B1 * | 1/2001 | Van Duyn ............... F01D 21/04 60/223 |
| 6,357,220 B1 | 3/2002 | Snyder et al. |
| 7,500,365 B2 | 3/2009 | Suciu et al. |
| 8,192,143 B2 | 6/2012 | Suciu et al. |
| 2006/0248900 A1 * | 11/2006 | Suciu ....................... F02C 7/32 60/802 |
| 2008/0098717 A1 * | 5/2008 | Orlando ................... F01D 1/24 60/226.1 |
| 2008/0286094 A1 * | 11/2008 | Jain ........................ B64D 33/02 415/148 |
| 2009/0060704 A1 * | 3/2009 | Hurwitz ................ B64D 33/02 415/1 |
| 2009/0232640 A1 * | 9/2009 | Deperrois ................ F02C 7/32 415/122.1 |
| 2009/0290976 A1 | 11/2009 | Suciu et al. |
| 2010/0242496 A1 * | 9/2010 | Cass ........................ F02C 7/32 60/802 |
| 2011/0154827 A1 * | 6/2011 | Ress, Jr. .................. F02C 7/275 60/772 |
| 2011/0203293 A1 * | 8/2011 | Glahn ....................... F02C 6/08 60/785 |
| 2011/0239660 A1 | 10/2011 | Suciu et al. |
| 2011/0252807 A1 * | 10/2011 | Huang .................... B64D 41/00 60/788 |
| 2011/0289936 A1 | 12/2011 | Suciu et al. |

OTHER PUBLICATIONS

International Preliminary Report on Patentability for International Application No. PCT/US2013/022370 dated Apr. 2, 2015.
International Search Report, dated Mar. 29, 2013.

* cited by examiner

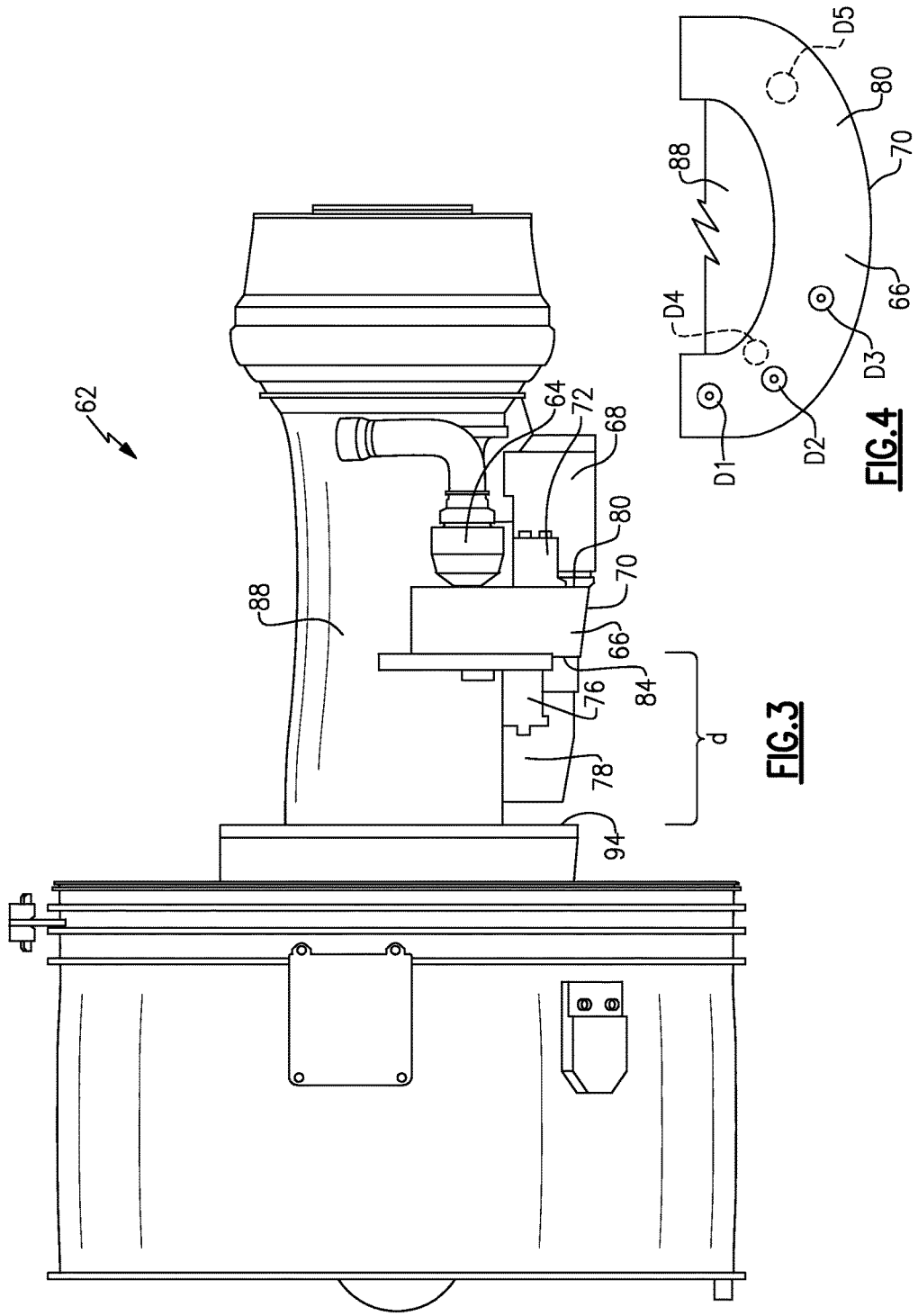

GEARED GAS TURBINE ENGINE ACCESSORY GEARBOX

CROSS-REFERENCE TO RELATED APPLICATIONS

This application claims priority to U.S. Provisional Application No. 61/703,446, which was filed on 20 Sep. 2012 and is incorporated herein by reference.

BACKGROUND

This disclosure relates generally to an accessory gearbox and, more particularly, to mounting and placing an accessory gearbox within a gas turbine engine.

Gas turbine engines, such as gas turbine engines, typically include a fan section, a compression section, a combustion section, and a turbine section. Gas turbine engines may employ a geared architecture connecting portions of the compression section to the fan section.

Gas turbine engines often include an accessory gearbox that is utilized to rotatably drive various accessories. Packaging the accessory gearbox and the accessories is difficult. It is especially difficult to package the accessory gearbox and accessories within gas turbine engines having geared fan-drive architectures as these gas turbine engines typically have a shorter overall axial length than other types of gas turbine engines. Some conventional accessory gearboxes are located near the aft of the engine and require a relatively long driveshaft from the compressor. Placing the accessory gearbox in this area exposes the accessory gearbox to relatively high temperatures. Some conventional accessory gearboxes are mounted to a fan case of the engine.

SUMMARY

A gas turbine engine according to an exemplary aspect of the present disclosure includes a gearbox. The gearbox includes a housing at a forward part of a core compartment of a gas turbine engine. A plurality of accessory drives are each configured to rotatably couple the gearbox to one of a plurality of accessory components.

In a further non-limiting embodiment of the foregoing gas turbine engine, the gas turbine engine includes a generator rotatably coupled to the one of the plurality of accessory drives at the lowest elevation relative to the other of the plurality of accessory drives.

In a further non-limiting embodiment of either of the foregoing gas turbine engines, the plurality of accessory drives are exclusively on an aft side of the housing relative to a direction of flow through the gas turbine engine.

In a further non-limiting embodiment of any of the foregoing gas turbine engines, the housing abuts an intermediate case of the gas turbine engine.

In a further non-limiting embodiment of any of the foregoing gas turbine engines, the gas turbine engine includes a high pressure compressor and a low pressure compressor. The intermediate case is positioned axially between the high-pressure compressor and the low-pressure compressor.

In a further non-limiting embodiment of any of the foregoing gas turbine engines, the housing is directly attached to a core section of the gas turbine engine.

In a further non-limiting embodiment of any of the foregoing gas turbine engines, the housing comprises a first housing portion and a second housing portion located on an opposing lateral side of the gas turbine engine from the first housing portion.

In a further non-limiting embodiment of any of the foregoing gas turbine engines, the first portion includes accessory drives on exclusively the aft side of the housing.

In a further non-limiting embodiment of any of the foregoing gas turbine engines, the first portion includes accessory drives on both a forward and an aft side of the housing.

In a further non-limiting embodiment of any of the foregoing gas turbine engines, the first portion and the second portion are at the same axial location.

A gas turbine engine according to another exemplary aspect of the present disclosure includes a geared architecture configured to be driven by a shaft that is rotating at a first speed. The geared architecture is configured to rotate a fan at a second speed different than the first speed. An accessory gearbox housing abuts an intermediate case of the gas turbine engine.

In a further non-limiting embodiment of the foregoing gas turbine engine, the accessory gearbox is configured to drive an aircraft generator that is secured to an aft side of the accessory gearbox, the aircraft generator at a low elevation relative other accessories driven by the accessory gearbox.

In a further non-limiting embodiment of either of the foregoing gas turbine engines, the accessory gearbox is a first accessory gearbox portion and a second accessory gearbox portion is secured to the intermediate case opposite the first accessory gearbox portion.

In a further non-limiting embodiment of any of the foregoing gas turbine engines, the second accessory gearbox includes accessory drives on both a forward and an aft side.

In a further non-limiting embodiment of any of the foregoing gas turbine engines, the accessory gearbox is configured to attach to a core of a gas turbine engine.

A method of positioning an accessory gearbox according to another exemplary aspect of the present disclosure includes, placing an accessory gearbox in a forward portion of a core compartment of a gas turbine engine, and securing the accessory gearbox to a core of the gas turbine engine.

In a further non-limiting embodiment of the foregoing method of positioning an accessory gearbox, the method includes driving an aircraft generator accessory from a drive location of the accessory gearbox, the drive location at a relatively low elevation compared with other drive location of the accessory gearbox.

Although the different examples have the specific components shown in the illustrations, embodiments of this disclosure are not limited to those particular combinations. It is possible to use some of the components or features from one of the examples in combination with features or components from another one of the examples.

DESCRIPTION OF THE FIGURES

The various features and advantages of the disclosed examples will become apparent to those skilled in the art from the detailed description. The figures that accompany the detailed description can be briefly described as follows:

FIG. 3 shows a partial section view of a side of the gas turbine engine of FIG. 2.

FIG. 4 shows the gearbox in FIG. 3 viewed from an aft of the gas turbine engine and having the accessories removed.

DETAILED DESCRIPTION

Figure 1:
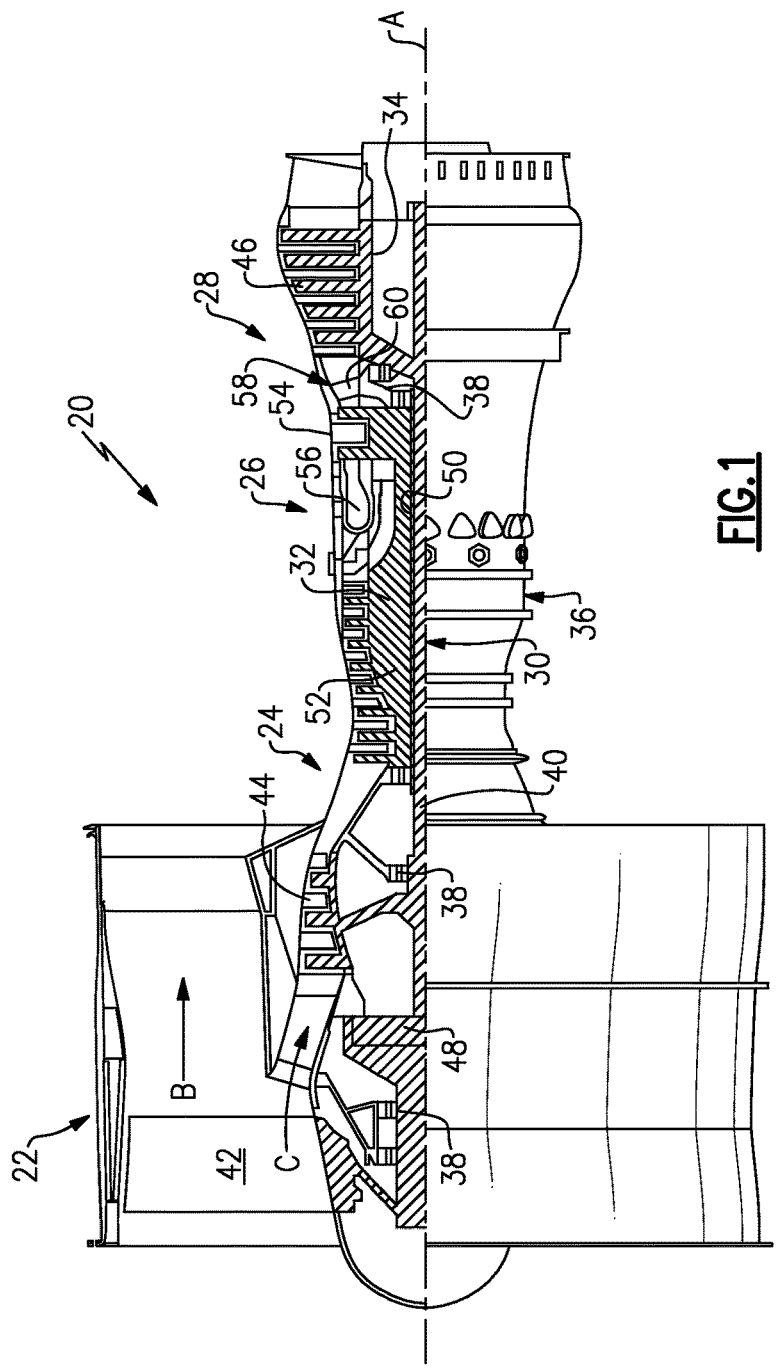
FIG. 1 shows a cross-section view of an example turbine engine gas turbine engine.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram}° \text{R})/(518.7° \text{R})]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

Referring now to FIGS. 2 to 5 with continuing reference to FIG. 1, an engine 62 is a variation of the engine 20. The engine 62 includes an accessory gearbox 66 that is utilized to rotatably drive various accessories. In this example, these accessories include at least a starter 64, an aircraft generator 68, a Permanent Magnet Alternator/Permanent Magnet Generator (PMA/PMG) 72, a hydraulic pump 76, and a lubricant scavenge pump 78. A tower shaft (not shown) may rotatably couple the accessory gearbox 66 to the high speed spool 32. During operation, rotation of the high speed spool 32 rotatably drives the accessory gearbox 66.

In this example, the starter 64, the generator 68, and the PMA/PMG 72, are rotatably coupled to of a plurality of accessory drives, such as, for example, three drives D1, D2, D3, respectively. These three drives D1-D3 are located on an aft side 80 of the accessory gearbox 66. The hydraulic pump 76 and lubricant scavenge pump 78, by contrast, are rotatably coupled to fourth and fifth accessory drives D4 and D5 on a forward side 84 of the accessory gearbox 66. Aft and forward are determined with reference to the general direction of flow through the engine 62. The five accessory drives D1-D5 represent the location where the accessories rotatably engage the accessory gear box 60.

Of the accessories rotatably coupled to the accessory gearbox 66, the generator 68 is located at the vertically lowest position. That is, the generator 68 is rotatably coupled to the third accessory drive D3 that is at a first elevation, and the starter 64, the PMA/PMG 72, the hydraulic pump 76 and the lubricant scavenge pump 78 are coupled to all but the third accessory drive, that is, the four other accessory drives D1, D2, D4, and D5 at elevations that are higher than the first elevation. Elevation, in this disclosure, refers generally to a distance or height when a system is in an orientation representative of the engine 62 or an associated aircraft being on level ground or in straight or level flight.

The generator 68 is one of the heaviest accessories driven by the accessory gearbox 66. Placing the generator 68 at a lower elevation positions the generator 68 in a location convenient for maintenance and repair.

An outer housing 70 of the example accessory gearbox 66 is mounted directly to a casing 88 of a core of the engine 62. Mechanical fasteners can be used to secure the outer housing 70.

The casing 88 generally provides the outer boundary of a core flowpath C through the engine 62. The core flowpath extends through the low-pressure compressor 44, the high-pressure compressor 52, the combustor 56, the high-pressure turbine 54, and the low pressure turbine 46. At a given axial location, the core is generally the portions of the engine 62 radially inside the bypass flowpath.

Another casing 90 of the core may be positioned radially outside the accessory gearbox 66. The casing 90 has been removed in FIGS. 3 to 5 to show the accessory gearbox 66. This casing 90 generally provides the inner boundary of a bypass flowpath B through the engine 62.

The engine 62 includes a core compartment 92 bounded by the casing 88 and the casing 90. The example accessory gearbox 66 is positioned within the core compartment 92.

In this example, a forward boundary of the core compartment 92 is established by an intermediate case 94 of the engine 62. The intermediate case 94 is a structural case positioned between the high-pressure compressor 52 and the low-pressure compressor 44.

The example accessory gearbox 66 is mounted at a forward position within core compartment 92 of the engine 62. Due to the hydraulic pump 76 and the lubricant scavenge pump 78, which are coupled at drive positions on the forward side 84 of the accessory gearbox 66, the accessory gearbox 66 is spaced axially a distance d from the intermediate case 94.

The example accessory gearbox 66 extends laterally across the rotational axis A of the engine 62 such that portions of the accessory gearbox 66 are on either side of the rotational axis A.

Figure 2:
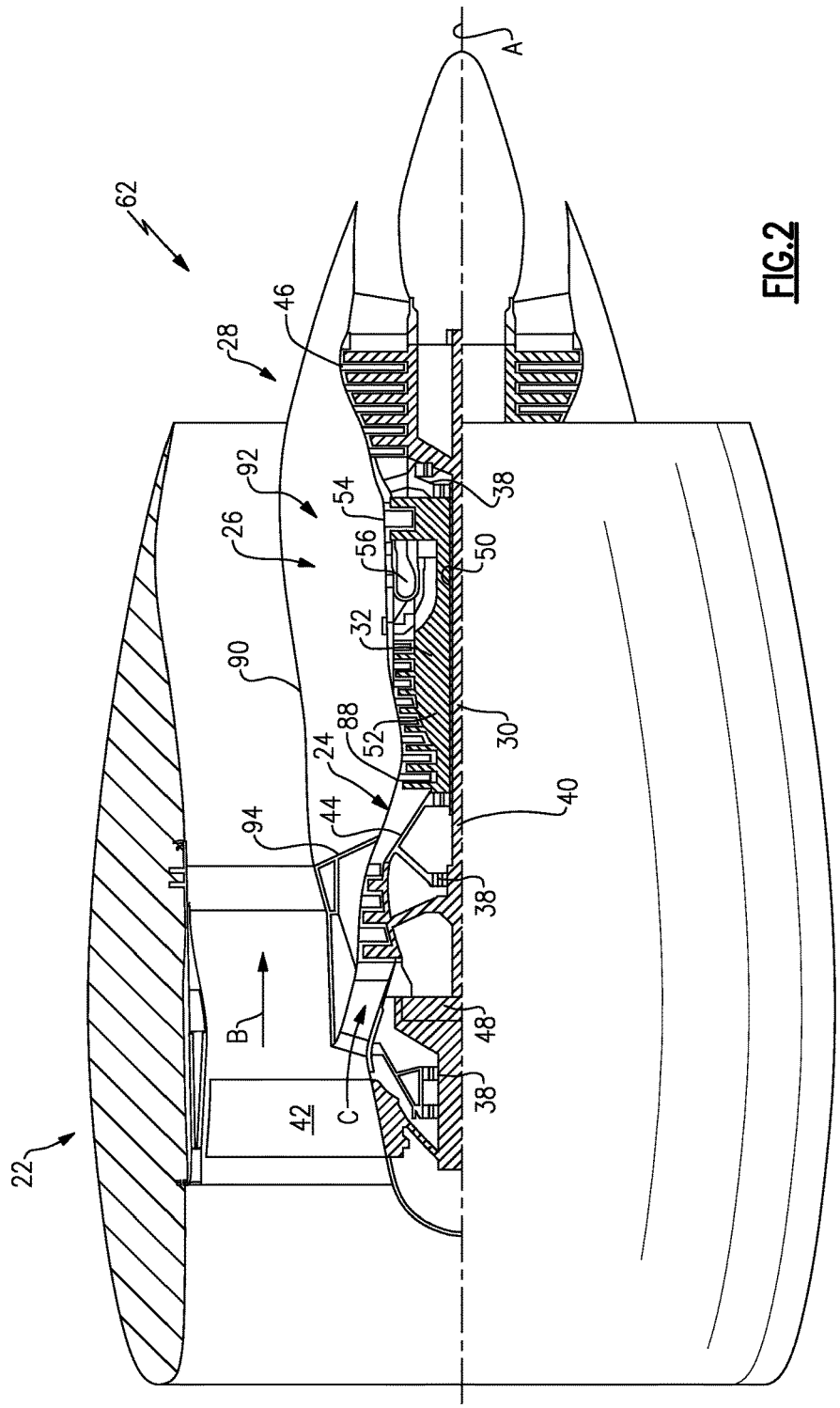
FIG. 2 shows a variation of the FIG. 1 gas turbine engine.
Figure 5:
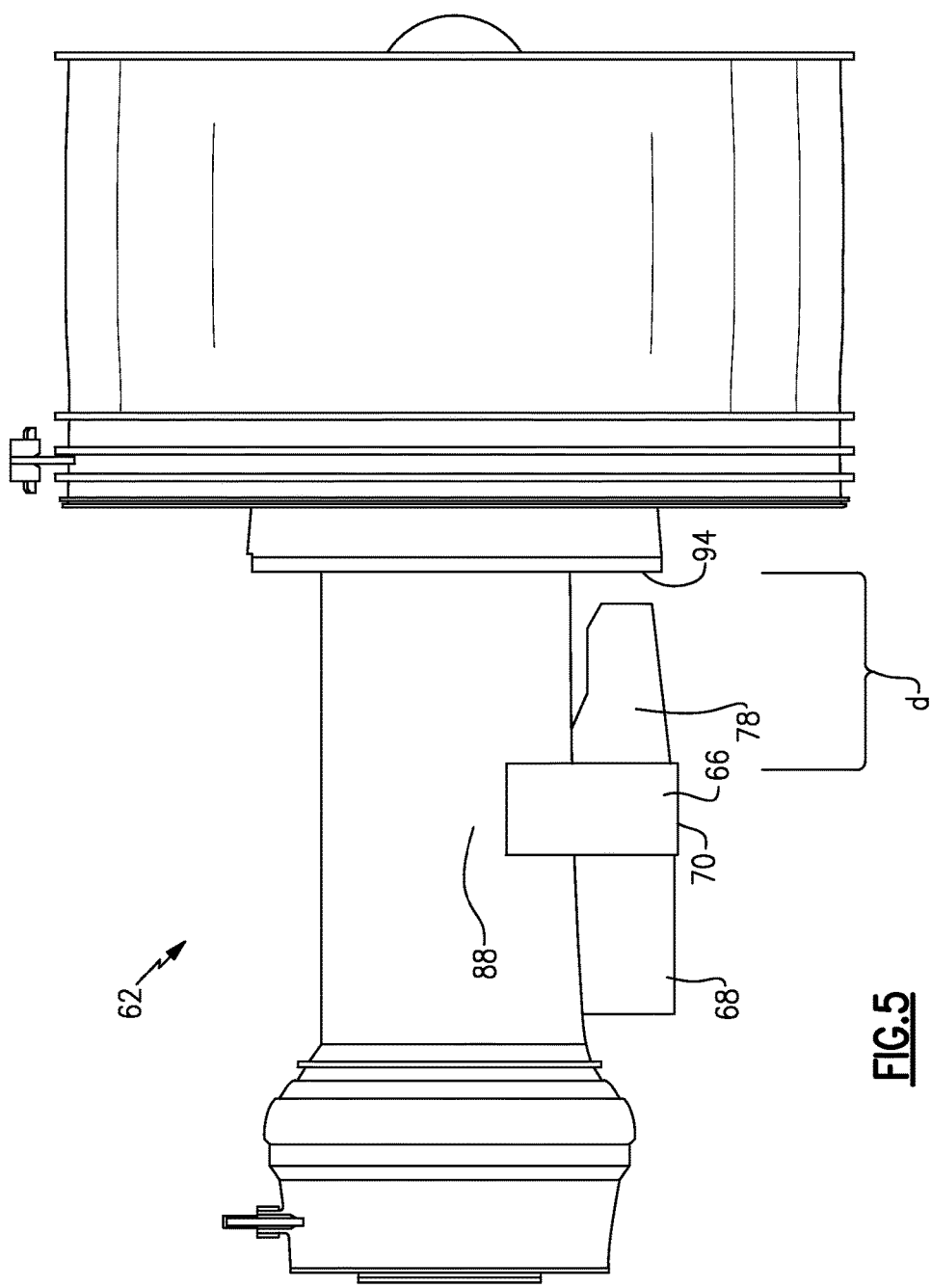
FIG. 5 shows a partial section view of an opposing side of the gas turbine engine of FIG. 3.
Figure 6:
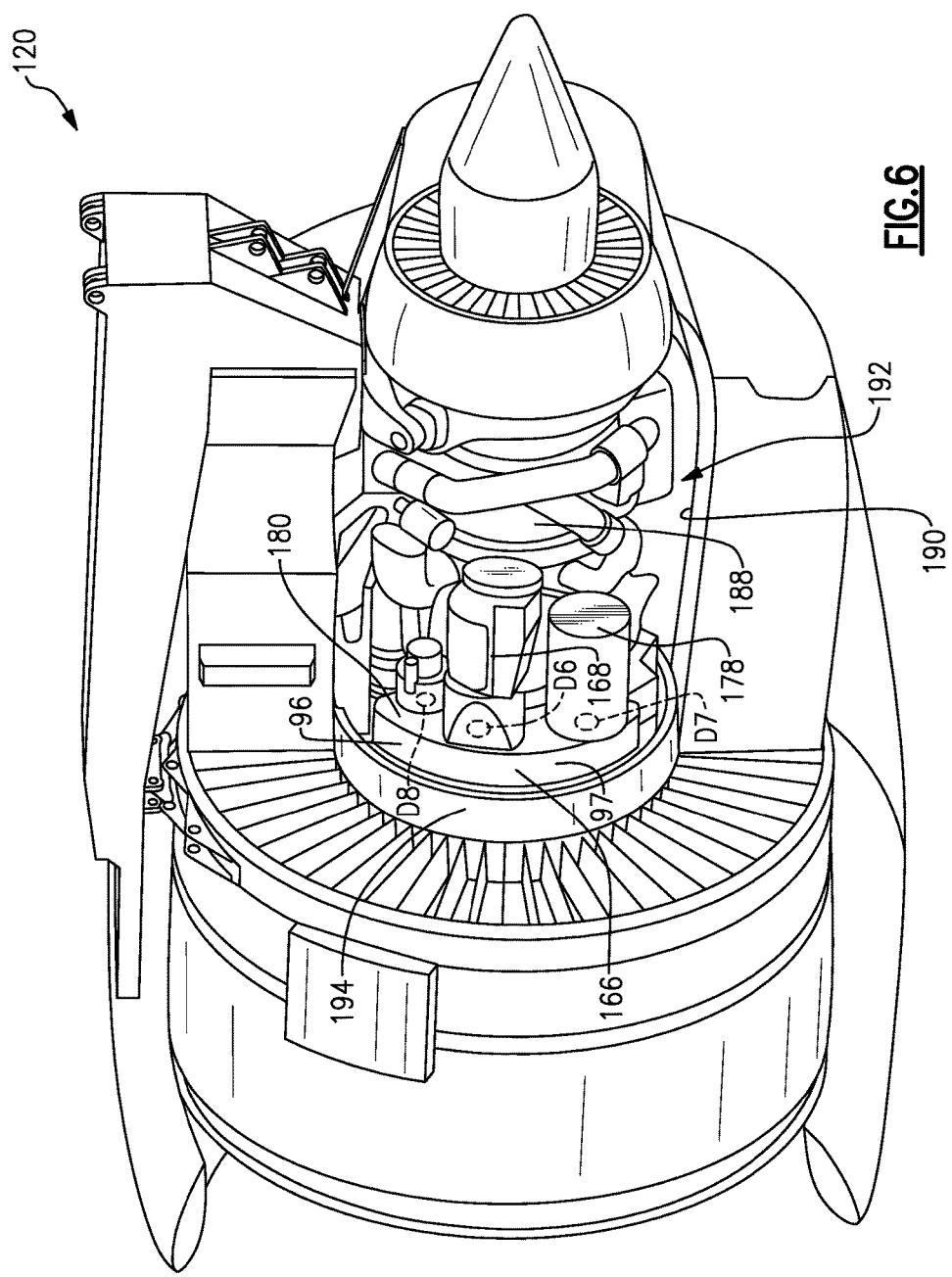
FIG. 6 shows a partial section and perspective view from a rear of another example gas turbine engine gas turbine engine.
Figure 7:
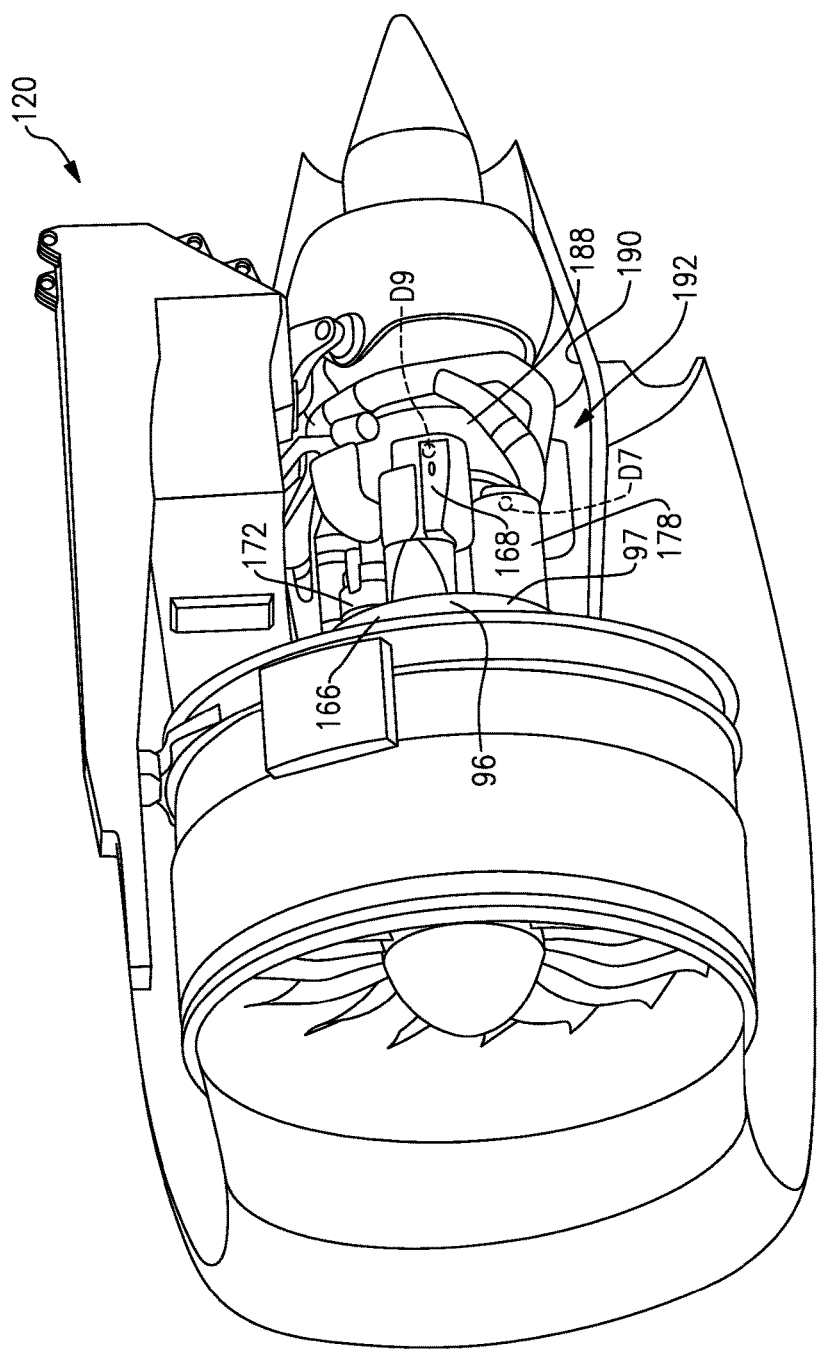
FIG. 7 shows a partial section and perspective view from a front of the gas turbine engine of FIG. 6.
Figure 8:
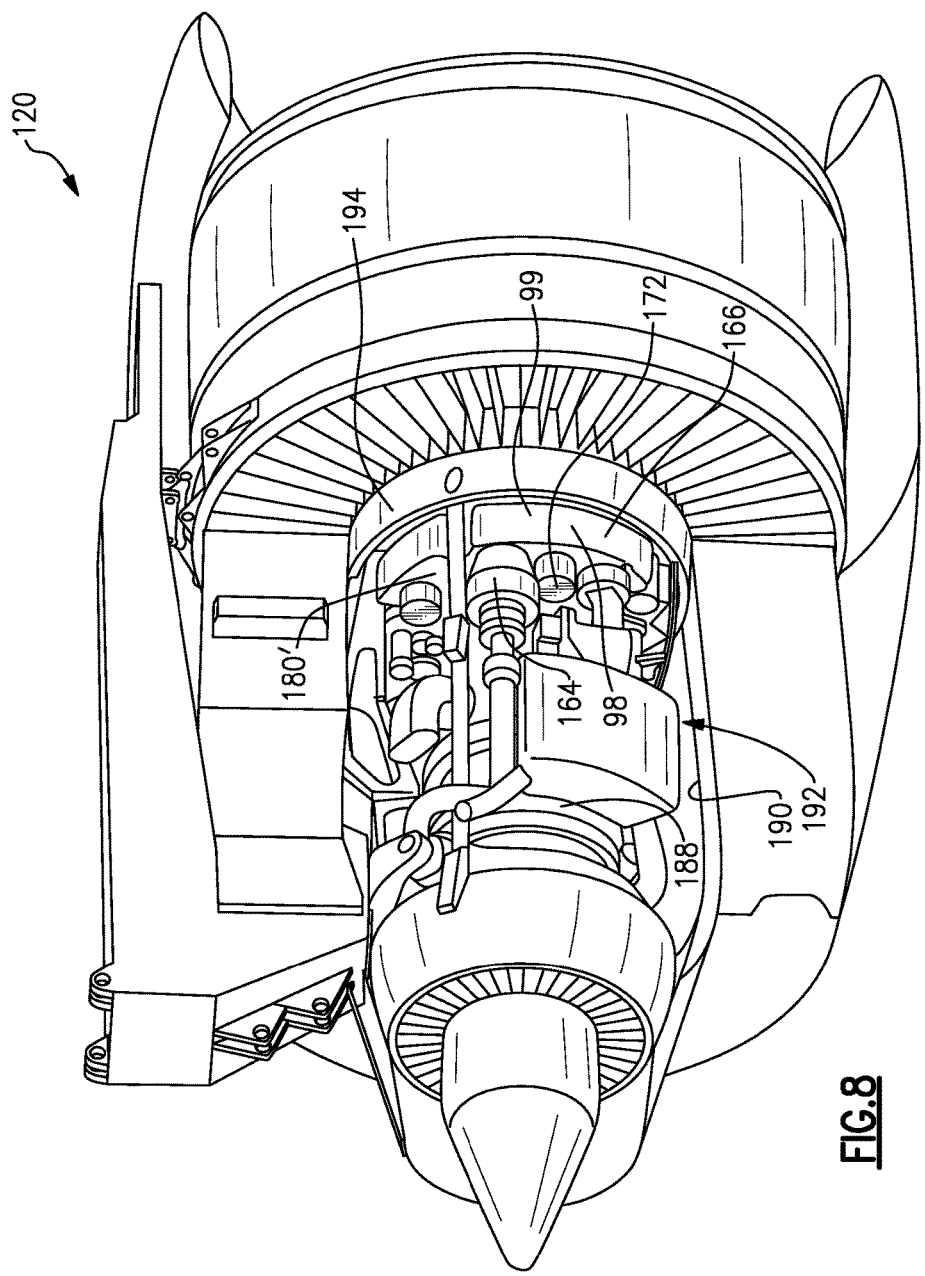
FIG. 8 shows a partial section and perspective view from the rear and on an opposite side of the gas turbine engine of FIG. 6.

Referring now to FIGS. 6 to 8 with reference to FIG. 2, another example engine 120 includes an accessory gearbox 160 directly connected to an intermediate case 194. Due to the direct connection, there is substantially no axial space between the accessory gearbox 160 and the intermediate case 194. The accessory gearbox 160 is located in the forwardmost position within a core compartment 192 of the engine 120. A casing 188 and a casing 190 radially bound the core compartment 192 of the engine 120.

The example accessory gearbox 160 includes a first portion 96 and a second portion 98. The first portion 96 is separate from the second portion 98. The first portion 96 and the second portion 98 are essentially separate gearboxes used to rotatably drive different accessories. The first portion 96 and the second portion 98 of the gearbox 160 can be driven by a separate power takeoff from the engine 120, such as by separate tower shafts, or by a common takeoff through a linking drive mechanism.

The first portion 96 and the second portion 98 are located on opposite laterally sides of the rotational axis A of the engine 120. In this example, the first portion 96 and the second portion 98 include areas that axially overlap and are thus considered axially to be at the same axial location within the gas turbine engine 120. Using a rotatable input from, for example, the high speed spool 32 the first portion 96 rotatably drives at least a PMA/PMG 172, a generator 168, and a hydraulic pump 178. All of the accessories driven by the first portion 96 engage sixth through eighth accessory drives D6-D8, on an aft side 180 of the first portion 96. The PMA/PMG 172, the generator 168, and the hydraulic pump 178 are all rotatably coupled to the first portion 96 at different ones of the sixth through eighth accessory drives D6-D8. The first portion 96 includes at least a housing 97 holding gearing suitable for transferring the rotatable input to the sixth through eighth accessory drives D6-D8 of the first portion 96.

Using a rotatable input from, for example, the high speed spool 32 the second portion 98 of the accessory gearbox 160 rotatably drives at least the starter 164. The starter 164 and any other accessories driven by the second portion 98 are rotatably coupled to the second portion 98 at different accessory drives, such as a ninth drive D9. All of the accessories driven by the second portion 98 engage accessory drives, such as the ninth drive D9, on the aft side 180' of the second portion 98. The second portion 98 includes at least a housing 99 holding gearing suitable for transferring the rotatable input to the accessory drives of the second portion 98.

Features of the disclosed examples include an accessory gearbox mounted in a location facilitating nacelle aero line performance and in a location providing favorably thermal energy levels.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A gas turbine engine comprising a gearbox, wherein the gearbox comprises:
   a housing at a forward part of a core compartment of a gas turbine engine such that the housing is radially inside a bypass flowpath of the gas turbine engine;
   a plurality of accessory drives that each rotatably couple the gearbox to one of a plurality of accessory components;
   a generator rotatably coupled to the one of the plurality of accessory drives at the lowest elevation relative to the other of the plurality of accessory drives and any other accessory drives rotatably coupling the gearbox to an accessory component;
   wherein the plurality of accessory drives and any other accessory drives rotatably coupling the gearbox to an accessory component are exclusively on an aft side of the housing relative to a direction of flow through the gas turbine engine;
   wherein the gas turbine engine includes a fan that delivers a portion of air into a compressor section and a portion of air into a bypass duct, wherein a bypass ration is greater than 10, the bypass ratio being a ratio of a volume of air passing to the bypass duct compared to a volume of air passing into the compressor section;
   wherein a forward side of the housing abuts to an intermediate case of the gas turbine engine, and the intermediate case is positioned axially between a high-pressure compressor and a low-pressure compressor of the compressor section; and
   wherein the plurality of accessory component include a starter, a hydraulic pump and a lubricant pump each rotatably coupled to a respective accessory drive of the other of the plurality of accessory drives at a relatively higher than the generator.

2. The gas turbine engine of claim 1, wherein the housing is directly attached to a core section of the gas turbine engine.

3. The gas turbine engine of claim 1, wherein the housing comprises a first housing portion and a second housing portion located on an opposing lateral side of the gas turbine engine from the first housing portion.

4. The gas turbine engine of claim 3, wherein the first portion and the second portion are at the same axial location.

5. The gas turbine engine of claim 1, further comprising:
   a geared architecture driven by a shaft rotatable at a first speed such that the fan rotates at a second speed different than the first speed.

6. The gas turbine engine of claim 5, wherein the gearbox is a first accessory gearbox portion and a second accessory gearbox portion secured to the intermediate case opposite the first accessory gearbox portion.

7. The gas turbine engine of claim 6, wherein the gearbox attaches to a core of the gas turbine engine.

8. A method of positioning an accessory gearbox, comprising the steps of:
   placing an accessory gearbox in a forward portion of a core compartment of a gas turbine engine;
   securing the accessory gearbox to a core of the gas turbine engine, the gas turbine engine including a geared architecture driven by a shaft rotatable at a first speed such that a fan of the gas turbine engine rotates at a second speed different than the first speed;
   wherein the gas turbine engine includes a fan that delivers a portion of air into a compressor section and a portion of air into a bypass duct, wherein a bypass ratio is greater than 10, the bypass ratio being a ratio of a volume of air passing to the bypass duct compared to a volume of air passing into the compressor section;
   driving an aircraft generator accessory from a drive location of the accessory gearbox, the drive location at the lowest elevation relative to all other drive locations of the accessory gearbox;
   wherein the accessory gearbox includes a plurality of accessory drives that each rotatably couple the accessory gearbox to one of a plurality of accessory components, wherein all of the plurality of accessory drives are on an aft side of the accessory gearbox relative to a direction of flow through the gas turbine engine;
   securing a housing of the accessory gearbox to an intermediate case of the gas turbine engine, wherein the intermediate case is positioned axially between a high-pressure compressor and a low-pressure compressor of the compressor section, and a forward side of the housing abuts to the intermediate case; and
   wherein the plurality of accessory components include a starter, a hydraulic pump and a lubricant pump each rotatably coupled to a respective accessory drive of the other of the plurality of accessory drives at a relatively higher elevation than the aircraft generator.

9. The gas turbine engine of claim 3, wherein the first and second housing portions receive a rotatable input from a common spool.

10. The method of claim 8, wherein the step of securing the housing includes directly connecting the accessory gearbox to the intermediate case.

* * * * *

UNITED STATES PATENT AND TRADEMARK OFFICE
CERTIFICATE OF CORRECTION

PATENT NO. : 10,184,404 B2
APPLICATION NO. : 14/427334
DATED : January 22, 2019
INVENTOR(S) : Thomas G. Cloft and Robert L. Gukeisen Page 1 of 1

It is certified that error appears in the above-identified patent and that said Letters Patent is hereby corrected as shown below:

In the Claims

In Claim 1, Column 7, Line 33; replace "ration" with --ratio--

Signed and Sealed this
Twelfth Day of May, 2020

Andrei Iancu
*Director of the United States Patent and Trademark Office*